May 29, 1934.   H. H. WELCH   1,960,401
METHOD OF AND MEANS FOR INDICATING LIQUID LEVELS
Filed Feb. 7, 1919
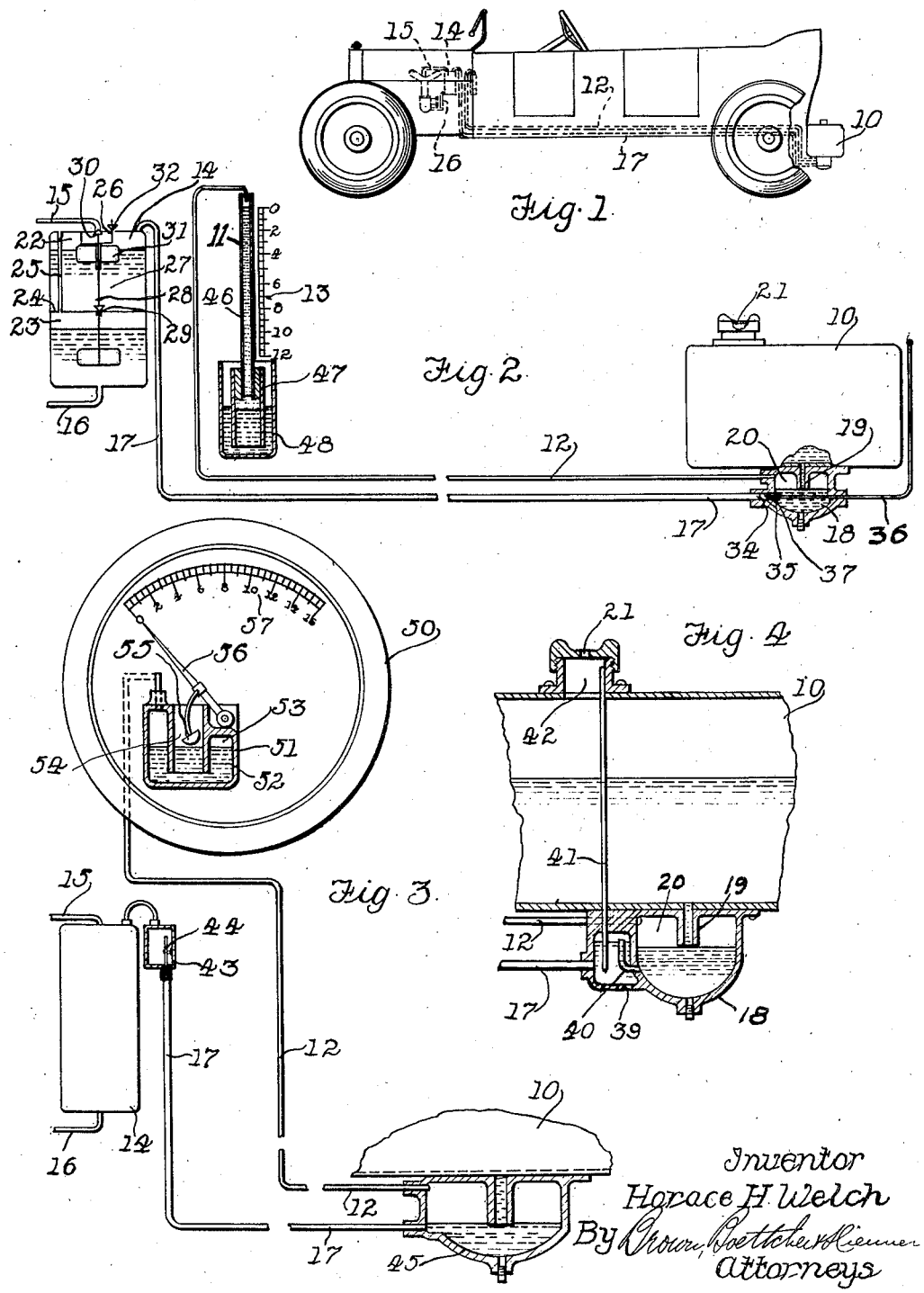
Inventor
Horace H Welch
By Brown, Boettcher & Kiemen
Attorneys Patented May 29, 1934

1,960,401

UNITED STATES PATENT OFFICE 1,960,401

METHOD OF AND MEANS FOR INDICATING LIQUID LEVELS

Horace H. Welch, Chicago, Ill., assignor to Bendix Stromberg Carburetor Company, Chicago, Ill., a corporation of Illinois Application February 7, 1919, Serial No. 275,506

43 Claims. (Cl. 73—54)

My invention relates to an improved method of, and means for indicating the quantity of liquid contained in a reservoir or tank, and has special reference to a liquid level indicator, for the purpose of showing the quantity of gasoline or other liquid fuel, contained in the storage tank or reservoir of an automobile and is particularly adapted for use with a reservoir or tank which is positioned at a distance from the indicator.

It is customary, at the present time, to arrange the fuel tank on an automobile beneath the floor and usually at the rear of the body, and to raise the fuel from the tank to a small vacuum feed tank arranged near the engine and higher than the carbureter, so that the carbureter feed chamber can be fed by gravity. My invention relates particularly to a simple means for accurately indicating, preferably on the dash board of the automobile, the depth of the liquid in the storage tank, or in other words, its quantity. There have been many pressure indicating means devised to indicate the quantity of the fuel, which depend upon an indicator of some kind on the dash-board and a connecting tube between the indicator and the storage tank. Practically all such systems, so far as I am advised, depend upon an air line as a means of transmitting the indicating pressure, but so far as I am informed, these systems have proven unreliable as to exact indications, due partly to changes in temperature, partly to the vaporization of the gasoline, and partly to the absorption of the air by the gasoline.

As gasoline is the liquid fuel commonly used, which is vaporizable at ordinary temperatures, and as the air contained in the indicating system is usually in free contact with the gasoline, the air contains a larger or small percentage of gasoline vapor, depending upon its temperature. In such a system there is a constant interchange of gasoline vapor for the air and in time the system may consist principally of the vapor of the gasoline, under which condition, changes in temperature, which are constantly occurring, would more greatly effect the accuracy of the indications. By means of my invention, I provide for a constant addition of fresh air to the system, which not only prevents the enrichment of the air in the system by the vaporization of the gasoline, but also preserves the system in accurate indicating condition.

It is desirable to cause the body of gas which operates the indicator periodically or intermittently to take in a fresh charge of air in order to avoid inaccuracies and faults of operation which are due to variations of atmospheric conditions and the like. For example, where the automobile passes through changes in barometric pressure, it is desirable that the gas trap be periodically recharged with air in order to insure that the system is full of air. The same thing is true with regard to temperature. Changes in temperature naturally expand and contract the gas in the trap and in the connecting pipe to the indicator and cause error in the system unless the system is maintained full of gas.

By means of my invention, I am not only enabled to eliminate the possibility of inaccuracy of indication, but also to provide an indicating system which is substantially constantly in proper working condition; which if not in proper working condition, due to the condensation of vapor or the absorption of air, can be readily placed in proper indicating condition; which can be readily tested and proven to be in proper working condition, to provide a system which is automatically thus maintained in proper working condition, as long as the engine is running, to provide a system in cooperation with the vacuum feed system, and by means of which the indicating system is constantly maintained in perfect indicating condition.

My invention will be more readily understood by reference to the accompanying drawing, in which:

Figure 1 is a side elevation of an automobile, provided with a liquid level indicating system for indicating the quantity of fuel in the fuel tank, said system being made in accordance with my invention;

Figure 2 is a diagrammatic view illustrating an indicating system typical of my invention and such as could be applied to an automobile;

Figure 3 is a similar view illustrating a slightly modified adaptation of the vacuum system for maintaining the indicating system in true level indicating condition; and Figure 4 is a fragmentary view illustrating another apparatus using the vacuum feed system to maintain the indicating system in accurate indicating condition.

In said drawing, 10 represents the storage tank or reservoir containing, in the case of an automobile, the liquid fuel the quantity of which it is desired to indicate. I provide an indicator 11 which is adapted to be placed upon the dash board of the automobile, and I connect the indicator 11 to the lower part of the tank 10 by a tube or pipe 12, so that the static pressure or the depth of liquid in the tank 10, can be transmitted to the indicator to indicate the depth or quantity of liquid. I provide a scale 13, in conjunction with the indicator, which is arranged to indicate, preferably the gallons of fuel in a tank of known size, the gallons being proportionate to the depth or pressure.

As is usual in vacuum feed systems for the fuel of automobiles, a small elevated liquid fuel reservoir 14, is provided, connected to the intake of the engine by a draft tube 15, to the carburetor by a feed pipe 16, and to the lower part of the storage tank 10 by a pipe 17.

Referring particularly to Figure 2; I provide the storage tank 10 with a sump or trap 18, on its bottom into which the liquid fuel from the tank 10 flows by gravity. I connect the sump 18 with the interior of the tank by a feed pipe 19, through which the gasoline in the tank freely flows to the sump. The upper end of the pipe 19 is flush with the floor of the tank and the pipe 19 projects down into the sump 18, toward the bottom thereof, ending at a point above the bottom of the sump. The sump, with the pipe 19, thus forms a trap into which the liquid freely flows from the tank 10 and traps the air in the upper part 20 of the sump, above the lower end of the pipe 19, and compresses the air thus caught in the upper part of the trap.

I connect the indicator pipe 12 to the sump 18 at the top of the air space 20 thus formed, and thus prevent the entrance of any liquid into the pipe 12. The pressure produced in the air space by the head of liquid in the fuel tank, is carried through the connecting pipe 12 and caused to operate the indicator 11 to indicate upon the dashboard of the automobile, the level of the liquid in the tank or its quantity. Due allowance, of course, must be made for the difference in height between the bottom of the tank and the lower end of the pipe 19, as this height adds pressure without adding volume of fuel, but this allowance once being made by the arrangement of the indicator scale, with reference to the indicator, it does not have to be thereafter taken into consideration, as it is constant.

As any variation in the height of the liquid in the trap 18 will effect a corresponding variation in the indication of the quantity of liquid in the tank 10, I provide means for maintaining the liquid level in the trap 18, at a certain definite point, which is at the level of the lower end or mouth of the pipe 19.

My method of constantly maintaining the indicating system in proper condition for accurate indications, is to make use of the ordinary vacuum fuel feed system, to force, carry or inject a small quantity, or a few bubbles of fresh air, into the trap 18, each time the vacuum system operates to draw fuel from the storage tank into the vacuum feed tank. The air thus brought into the trap 18, rises through the liquid therein, into the upper part thereof, and, if the liquid in the trap 18 is above the lower end or mouth of the pipe 19, the liquid is forced down by this addition of air until it stands even with the mouth of the pipe 19, after which any further addition of air will cause some of the gaseous fluid which fills the air trap, to escape up through the pipe 19 and through the liquid in the tank 10, the tank 10 being provided with an air vent 21, for affording free escape to the atmosphere.

While the structural means for causing the operation of the vacuum fuel feed to add air to the indicating system may take different forms, they all include some means for causing air to be carried into the trap 18 upon each intermittent operation of the fuel feed system. In the vacuum feed system which I employ in connection with my indicating system, I provide the vacuum feed reservoir 14, which I arrange as follows: I divide the reservoir into an upper compartment 22 and a lower compartment 23, separated by a horizontal partition 24.

The pipe 16 enters the bottom of the lower compartment and the pipe 17 enters the top of the upper compartment. The pipe 15 connects with the intake manifold of the engine and also enters the upper compartment. I provide a vent 25, for the lower compartment, and a vent 26, for the upper compartment. The upper compartment is the pump chamber and the lower compartment is a supply chamber for the carburetor. I control the operation of the feed system by a float device 27, comprising a vertical valve rod 28, having a valve 29 for closing off communication between the chambers upon a downward movement of the valve rod and a valve 30, at its upper end, for closing off communication with the pipe 15, upon an upward movement of the valve rod. The rod is controlled by a float 31, in the upper chamber, which rises and falls according to the height of liquid in the upper chamber. I also provide a valve 32, controlled by the valve rod 28, and arranged to open the vent 26 when the valve 30 closes, and close the vent when the valve 30 opens. In the operation of this fuel feed system, the valve 29, being open, the valve 30 closed, and the vent 26 open, the liquid flows down into the lower compartment from the upper compartment to replace the liquid taken from the lower compartment by the carbureter. This continues until the float 31, in the upper chamber, sinks far enough to change the valves, viz., to close the valve 29, and open the valve 30, and close the vent 26, at which time the upper chamber is closed except that it communicates with the sump 18, through the pipe 17, and with the intake manifold of the engine, and the vacuum which is induced in the upper chamber operates to draw liquid from the sump 18, through the pipe 17, into the chamber 22. When sufficient fuel is thus pumped into the chamber 22, to lift the float 31 high enough, it again reverses the several valves, thus opening communication to the lower tank, and cutting off the vacuum connection, and opening the upper chamber to the air. As I connect the pipe 17 directly to the upper chamber without a valve, this action permits the liquid remaining in the pipe 17 to sink or flow back to the sump 18.

It will now be understood that the vacuum feed system operates intermittently to draw fuel from the tank 10 to the auxiliary reservoir 14.

To cause this intermittent operation of the vacuum system to maintain the indicating system in accurate indicating condition, I provide means for causing the return of the liquid in the pipe 17 at the cessation of the intermittent operation, to force or carry air into the trap 18, which may be more or less, but is at all times sufficient to maintain the air space 20 free from liquid and the liquid level in the trap 18 depressed to the level of the mouth of the pipe 19.

The means which I employ for this purpose, as illustrated in Figure 2, consist of a small chamber 34, in communication with the trap 18, below the liquid level thereof, through a restricted passage 35, and I enter the vacuum feed pipe 17, into this small chamber. I provide the restricted passage 35, by means of an air pipe 36, the delivery end 37 of which I enter into the chamber 34, through the passage 35, and by this means I choke or reduce the passage 35 to such an extent that when the vacuum feed system operates to draw fuel from the tank, I induce or produce a pressure in the chamber 34, enough below atmosphere, to draw out the liquid which may have risen in the pipe 36, and thereafter draw air through the said pipe 36, the pipe 36 being carried above the extreme upper liquid level of tank 10.

The air thus drawn into the chamber 34 is entrapped into the liquid being drawn into the pipe 17, through the restricted passage 35, and is carried in the form of separated bubbles along the pipe 17 and into the tank 14. At the end of the intermittent action of the vacuum feed system, and when the vent 26 opens, the liquid in the pipe 17, together with the bubbles of air entrapped therein, sinks back into the trap 18, and the air thus carried into the trap rises into the upper part thereof causing the level of liquid therein to sink to the level of the mouth of the pipe 19 and to be maintained at this point; at such time the air pipe 36 is sealed by the liquid in the trap 18.

In the form illustrated in Figure 4, I provide the auxiliary chamber 39, communicating with the trap 18 through a pipe 40, of a smaller area than the pipe 17, thus forming a restricted passage, and I enter the pipe 17 into the auxiliary chamber. The pipe 40 enters the trap 18 below the normal liquid level therein and its delivery end, in the chamber 39, is above the mouth of the pipe 17 and preferably adjacent to the top of the chamber. I provide an air inlet pipe 41 for this chamber 39, which, as shown, I extend up through the tank 10 to the top thereof preferably extending it up into the filling opening 42. As in the former instance, the indicator pipe 12, communicates with the upper part of the sump 18. Upon the operation of the vacuum feed system, I produce a pressure in the chamber 39 which is slightly below atmosphere, on account of the small size of the pipe 40, and this draws down the liquid out of the air pipe 41, and air follows into the chamber 39, rising into the upper part thereof, and upon a cessation of the vacuum feed, and when the liquid returns to the chamber through the pipe 17, the air thus trapped in the chamber 39, is forced into the trap 18, through the pipe 40, thus effecting the addition of air to the indicating system.

Now it is to be noted that the chamber 39 and its cooperating parts comprise an air introducing means which is employed for injecting or introducing air into the system by a definite displacement for each operation. That is to say, first the liquid piston is drawn down unsealing the atmospheric connection 41 and at the same time the pressure in the air trap 20 is relieved to the extent of permitting liquid to flow out of trap 18 into chamber 39. This chamber 39 is emptied by suction and then the chamber is put into communication with atmosphere. When suction is replaced by atmospheric pressure in the vacuum tank the liquid which operates as a piston rises and gives a definite displacement of air in the chamber 39 over into the air space 20. The above action is possible because of the fact that there is an open or unvalved connection 40 between chamber 39 and the air trap. Upon the cessation of suction the liquid in the chamber 39 rises a definite amount giving a definite displacement and forcing air over into the trap 18. The beginning of the upward motion of the liquid seals the air connection at the lower end of the pipe 41.

The continued flow of liquid with entrained air from the pipe 17 into the chamber 39 causes the liquid level in the chamber to rise above the upper end of the short pipe 40, and thereafter air and liquid are discharged through the pipe 40. The capacity of the chamber 39 is less than the return flow of liquid of the pipe 17. The action therefore of discharging air and liquid into the liquid below the air chamber 20 is the same in Fig. 4 as in Fig. 3 throughout this stage of operation.

In the form shown in Figure 3, instead of drawing air in by the drawing of the fuel up into the tank 14, as in the two forms heretofore described, I provide means for causing the return of the liquid to the trap 18, upon the cessation of the operation of the vacuum system, to draw air in and carry it to the trap 18. This means consists of a small chamber 43, interposed in the pipe 17, and arranged close to the tank 14. The pipe 17 connects the top of the chamber 43 with the top of the vacuum feed tank 14, and the bottom of the chamber 43, with the trap 18. I provide a small tube 44, arranged in the chamber 43, and extending from the upper part thereof, down into the open end of the pipe 17, the tube 44 is open at both ends and is smaller in external diameter than the pipe 17. The pipe 17 enters directly into the sump or trap 45, on the tank 10, instead of through a restricted passage, as in the two former instances, and the pipe 12 enters, as before, into the upper part of the sump 45. In this arrangement, when the vacuum system is in operation, pipe 17 and the chamber 43, are entirely full of liquid. When the vacuum system ceases to operate and air is admitted to the system into the upper part of the tank 14, the air follows into the upper part of the chamber 43, and the fall of liquid through the pipe 17 back to the trap 45, by reason of the lower end of the small pipe 44 extending within the open end of the pipe 17, draws air down the pipe 17, through the pipe 44, and some of this air reaches the trap 45. If but a small quantity of air thus reaches the trap, upon each operation of the vacuum feed system, the indicating system is maintained in proper working condition at all times.

While my improvement is not limited to use with any particular indicator, I have illustrated two forms of indicators which are peculiarly adapted for use in my system.

The indicator 11, which I have illustrated, is a simple manometer tube comprising a vertically extending indicating tube 46, of relatively small diameter, which enters, and is sealed into, the upper end of a larger tube 47, and which in turn is arranged within a vessel 48, closed at its bottom. The tube 47 extends down close to the bottom of the vessel 48, is open at its lower end and closed at its upper end, except that the tube 46 enters its upper end. It will be obvious that I might use an ordinary manometer U-tube, but this if it used a liquid of low specific gravity would probably be too long to mount on a ordinary dash-board, as it would have to be at least as long as the extreme variation of height of liquid in the tank 10. I reduce the length of manometer tube by the construction shown, as I use mercury in the lower part of the device and a lighter fluid, such as oil, in the tube 46. When the tank is empty, the level of the mercury is slightly below the lower end of the tube 46, and as the tank 10 is filled, the static pressure of the liquid in the tank is transmitted through the trap 18, and the pipe 12, to the top of the column of oil in the tube 46. The oil is forced down into the tube 47, which being of larger diameter than the tube 46, provides capacity to receive the oil upon the lowering of the level of mercury in proportion to the increase in pressure. Thus the scale shown in said figure, when the tank is full, indicates 12 gallons, and the top of the column of liquid is shown to the point marked 12 on the scale.

In Figure 3, I have illustrated another form of pressure indicator 50, which is very simple in construction and operation. This indicator comprises a manometer tube 51, adapted to contain mercury 52, one leg 53 of the tube being closed and connected to the pipe 12, and the other leg 54 is open to the air. I provide a float 55, adapted to rest upon the mercury in the open leg 54, and I operatively connect the float to a pivoted indicator hand 56, adapted, as the float raises and lowers, to swing over an indicating scale 57, which may be arranged to indicate inches of depth or gallons of fuel in the tank 10.

It will be obvious that while the indicators, which I have illustrated, have peculiar advantages adapting them especially for use in my system, that my system is not thus limited and that any suitable indicator may be made use of.

In the operation of my system, the air or gas line, comprising the air chamber 20, and the connecting pipe 12, is automatically maintained full of gaseous fluid and in proper working condition, by air supplied through the intermittent operation of the vacuum fuel system.

I provide a very simple means for testing the indicating system to discover if it is properly indicating the level of liquid. This consists simply in blowing air into the trap 18, through the air admission pipe, until the air begins to bubble up through the tank 10. This can be readily accomplished by applying the mouth directly to the open end of the air pipe, as the pressure to be overcome is but a few ounces, but, if desired, a small air pump can be attached. In any event, no harm can result from an over supply of air as it will merely rise through the pipe 19 and bubble up through the liquid in the tank 10. Another advantage which accrues through the use of my means of admitting air to the draft pipe 17, at its lower end, is that the liquid raised to the tank 14, through said pipe, is intermingled with air and thus the weight to be raised by the vacuum is decreased, as the column of liquid will not consist entirely of liquid, but of quantities of liquid separated by quantities of air. Thus the column in the pipe 17 will be reduced in weight and the liquid can be raised by a vacuum of less strength or it can be raised higher by the same vacuum, either of which advantages are of value, particularly when driving an automobile up a long hill where the ordinary relative levels are greatly disturbed.

In the form illustrated in Fig. 2, the air pressure in the trap need not be reduced to atmospheric pressure nor materially changed by the suction of the vacuum tank because the air may be drawn into the pipe 17 by the flow of liquid past its end by an action like that occurring in a Pitot tube pointing down stream. The opening of the pipe 19 may at the same time be made considerably larger than the opening of the pipe 17. Under these conditions, the inflow from the pipe 19 will satisfy the demand from the pipe 17 and the pressure in the trap will not be appreciably varied and a substantially correct reading of the indicator will be maintained at all times.

However, if the suction exerted through the pipe 17 is not completely satisfied by the liquid discharged from pipe 19 and this will be the case unless provision is made to the contrary, the air in the trap 18 will begin to expand as soon as suction is exerted on the pipe 17 and the indicator will drop toward zero, thereby indicating the operation of the vacuum tank. Upon the falling of the column of liquid and air in the pipe 17, the first thing that occurs is a recompressing of the air in the air space 20. This tends to carry the level of the liquid in trap 18 above the lower end of pipe 19. The air from the falling column in pipe 17 separates out by gravity and recharges the air trap bringing the level in trap 18 down to the end of the pipe 19. Any excess of air merely goes back into pipe 19 and escapes.

In the form shown in Fig. 4 the introduction of air into auxiliary chamber 39 is caused by a drop in pressure in said chamber to atmospheric pressure and below. This is not in this case as in Fig. 2 an injector or kinetic action involved which draws in the air, but a pure drop in pressure. The pressure prevailing in the air space of Fig. 4 depends again upon the relative sizes of pipes 19 and 40. The falling column of liquid and air in pipe 17 compresses the air in the top of chamber 39 forcing the same over into the trap 18. At the same time, the air separates out from the liquid in the chamber 39, adding more air to the charge which is forced back into trap 18. At the same time the pipe 41 is at once sealed with liquid.

It will be understood that the trap 18 or trap 18 with auxiliary chamber 39 is preferably mounted on the bottom of main tank 10. This is a structural convenience only and not an inherent necessity.

In the form shown in Fig. 3, the air is admitted through the column of descending liquid by the motion of said column in its downward travel. The action of drawing in air by the falling column in this form is like the drawing in of air by the rising column in the form of Figs. 2 and 4. The contents of tank 43 must be great enough to discharge liquid back through the length of pipe 17 into the air trap 45. This trap 45 need not necessarily be located on the bottom of tank 10, although structurally it is convenient to do so. In all three forms, the means which introduces the air into the trap is normally sealed by liquid. Hence, no mechanical valves, or the like, are necessary, and tightness of the system may be maintained. Hence, a correct indication may be available even though the system has been standing for a considerable period of time.

There is a considerable advantage in the intermittent operation of my device in that it indicates the character of the action of the vacuum tank and fuel supply system.

As many modifications of my system will readily occur to one skilled in the art, I do not limit or confine my invention, to the specific modes, steps or structural details herein shown and described.

I claim:

1. The herein described improvement comprising a tank to contain liquid, a pressure indicator at a distance from the tank, a gas trap communicating with the lower part of the tank and subject to the static pressure of the liquid therein, a conduit connecting the trap and the indicator, the trap and conduit adapted to contain gaseous fluid, and a vaccum tank for withdrawing liquid from the tank and air injecting means energized by operation of said vacuum tank for causing air to enter said trap to replenish any loss in volume of the gaseous fluid.

2. The herein described improved liquid level indicating system, comprising a tank to contain liquid, a pressure indicator at a distance from the tank, both the tank and the indicator open to the atmosphere, a pressure line adapted to contain a gaseous fluid connecting the indicator with the lower part of the tank, a trap at the lower part of the tank through which the pressure line connects with the tank, a chamber communicating with the trap below the liquid level therein through a restricted passage, a source of vacuum communicating with said chamber, and an air inlet pipe connected with said chamber.

3. The herein described improvement, comprising a tank to contain liquid, a trap in communication with its lower part adapted to trap a body of air, a pressure indicator at a distance, a conduit connecting the indicator with the trapped body of air, a chamber auxiliary to the trap and communicating therewith through a restricted passage, a vacuum feed pipe communicating with said chamber and through which liquid is adapted to be drawn by vacuum means, and an air inlet pipe communicating with said auxiliary chamber whereby air is drawn into said delivery pipe, causing the return of some of the air with the liquid to the trap upon a cessation of the vacuum.

4. The herein described liquid level indicating apparatus, comprising the combination of an automobile having a vacuum fuel feed system, and a liquid fuel storage tank, of a sump at the bottom of the tank, a feed pipe descending into the lower part of the sump from the tank, and forming with the sump a trap, an indicator, a pressure pipe connecting the indicator and the trap, and means operable by the vacuum fuel feed system for introducing air into the air trap to maintain the trap and pressure pipe full of gaseous fluid.

5. The improvements herein described, comprising a tank to contain liquid, a sump at the bottom of the tank, an open pipe leading from the bottom of the tank down into the sump, and forming therewith a trap for gas above the lower end of said pipe, a pressure indicator, a pipe connecting the indicator with the trap, an auxiliary chamber, means comprising a restricted passage providing a communication between the auxiliary chamber and the sump below the liquid level thereof, a vacuum pipe connected to said auxiliary chamber, and an air pipe leading into said auxiliary chamber.

6. In a fuel supply system for motor vehicles, a fuel tank, a gas filled system comprising a conduit extending from said tank to a remote point and a gas pressure operated indicator to indicate the amount of fuel in said tank, a fuel feeding device for withdrawing fuel from the tank for delivery to the motor vehicle engine, and charging means cooperating with said fuel feeding device for intermittently refilling said indicating system with gas.

7. In combination with a motor vehicle having a vented fuel tank, a vacuum fuel feed device for withdrawing liquid fuel from the tank; a chamber at the bottom of said tank providing a gas space, means actuated by the operation of said vacuum fuel feed device for introducing gas into said gas space until the same is filled and gas is discharged into said tank, a pressure gauge remote from said tank and chamber, and a gas filled passage between said chamber and gauge.

8. In a depth indicating device for liquid, the combination with a chamber communicating with a liquid at the full depth to be measured, of a second chamber, the top of which communicates with the lower part of said first mentioned chamber, means for introducing air into said second chamber, and a pressure gauge communicating with said first mentioned chamber.

9. In a depth indicating device for liquid, the combination with a chamber member having a first chamber communicating with the liquid at the full depth to be measured, and a second chamber communicating with said first chamber, means for conducting a mixture of liquid and air from said second chamber, and a pressure gauge communicating with said first chamber.

10. In a depth indicating device for liquids, the combination with a chamber communicating with the liquid at the full depth to be measured, of a second chamber, the top of which communicates with the lower part of said first mentioned chamber, a passageway for the liquid opening into said second chamber, a tube adapted for the passage of air connecting into said second chamber and extending above the liquid, means for drawing a mixture of the liquid and air from said second chamber, and a gauge in communication with said first mentioned chamber.

11. In a depth indicating device for liquid, the combination with a chamber member having a first chamber communicating with a liquid at the full depth to be measured, and a second chamber communicating with said first chamber through a restricted passageway opening into said second chamber for placing the interior of said second chamber in communication with the liquid in the first chamber, a tube adapted for the passage of air communicating with the second chamber and extending above the liquid, a suction tube adapted for the passage of mixture of the liquid and air for drawing the mixture from said second chamber, and a pressure gauge connected to said first mentioned chamber.

12. In a depth indicating device for liquids, the combination with a tank containing a liquid, of a chamber communicating with the liquid at the full depth to be measured, a second chamber, the top of which communicates with the lower part of said first mentioned chamber, a suction tube for drawing a mixture of air and a liquid from said second chamber, a tube communicating with said first mentioned chamber and adapted to communicate with a pressure gauge and a common mounting upon said tank carrying said tubes and chambers.

13. In a fuel supply system for motor vehicles, a fuel tank, a chamber communicating with the fuel at the full depth to be measured, a fuel feeding device for effecting an intermittent flow of the fuel and delivering the fuel to the motor vehicle engine, means operated by the intermittent flow of the fuel for introducing air into said chamber, and pressure indicating means connected to said chamber.

14. In a depth indicating device for liquids, the combination with a liquid fuel tank and a vacuum tank for drawing the liquid fuel therefrom, of an air chamber communicating with the liquid fuel at the full depth to be measured, means controlled by the operation of said vacuum tank for introducing air into said chamber, and pressure indicating means connected to said chamber.

15. In a fuel supply system for motor vehicles, a fuel tank, an air chamber communicating with the fuel at the full depth to be measured, means for producing a flow of the fuel and delivering the same to the motor vehicle engine, means dependent upon the fuel flow for introducing air into said air chamber, and a pressure gauge communicating with said air chamber.

16. In a fuel supply system for motor vehicles, a fuel tank, an air chamber communicating with the body of fuel at the full depth to be measured, a fuel feeding device for withdrawing fuel from the tank for delivery to the motor vehicle engine, means operated by said fuel feeding device for drawing air into the fuel being withdrawn from the tank and for introducing the drawn air into said air chamber, and a pressure gauge communicating with said air chamber.

17. In a depth indicating device for liquids, the combination with a chamber communicating with a body of liquid at the full depth to be measured, a second chamber the top of which communicates with the lower part of said first mentioned chamber, means for drawing liquid through said second chamber, means for drawing air into said second chamber conjointly with the flow of the liquid, and a pressure gauge communicating with said first mentioned chamber.

18. In a depth indicating device for liquids, the combination with an air chamber communicating with the liquid at the full depth to be measured, of means for automatically introducing air into said air chamber at a level below the level of communication of said chamber with the liquid, and a pressure gauge communicating with said air chamber.

19. In a depth indicating device for liquids, the combination with a chamber communicating with the liquid at the full depth to be measured, of a second chamber the top of which communicates with the lower part of the first mentioned chamber, a suction tube adapted for the passage of the liquid and air connecting into said second chamber, a passageway for the liquid opening into said second chamber, and having a portion with a cross-sectional area less than that of said suction tube, a tube adapted for the passage of air into said second chamber and extending above the liquid, and a pressure gauge connected to said first-mentioned chamber.

20. In combination, a main supply tank, an air trap communicating with the liquid in the lower part of the main tank, a pressure actuated indicator connected to the air trap, a chamber communicating with the lower part of said air trap, a vacuum tank connected to said chamber, means for injecting air into the chamber for recharging the air trap with air.

21. In combination, a main tank, a vacuum tank intermittently actuated to raise a column of liquid from the main tank, an air trap communicating with the liquid in the lower part of the main tank, an indicator connected to said trap, a connection from the air trap to the vacuum tank, and means for injecting air into the column of liquid while the same is being raised, said air being freed and compressed by the fall of the column of liquid back towards the main tank.

22. In combination, a main tank, intermittently operating pumping means and a connection therefrom for sucking a column of liquid from the main tank, to a point above said main tank and periodically operating means for breaking said suction, said connection including an air trap, an indicator actuated by the pressure in said air trap, and means for introducing air into said column of liquid while it is moving, said air being discharged into said air trap.

23. The method of indicating the depth of liquid in a tank which comprises raising a column of liquid by suction from the bottom of the tank, permitting said column of liquid to drop, introducing air into said column of liquid while the same is moving, separating out the air and trapping the same, compressing said trapped air between the falling column and the liquid in the tank, then indicating the pressure of said body of air in terms of depth.

24. In an apparatus of the class described, the combination of a liquid container, pressure responsive means for indicating the depth of liquid therein, a pressure transmitting conduit extending from said means to the container and provided with an opening whereby liquid from the container may enter it at a point below level of liquid in said container, and means forming an air confining chamber connected with said conduit at a point below the level of liquid therein, means to cause an increase of air pressure in said chamber, said means causing a portion of said air to be discharged into the conduit.

25. In an apparatus of the class described, the combination of a liquid container, pressure responsive means for indicating the depth of liquid therein, a pressure transmitting conduit extending from said means to the container and provided with an opening whereby liquid from the container may enter it at a point below level of liquid in said container, and means forming an air confining chamber connected with said conduit at a point below the level of liquid therein, means to cause an increase of air pressure in said chamber, said means causing a portion of said air to be discharged into the conduit, and means providing entrance of air to said chamber.

26. In combination, a liquid containing tank, a liquid withdrawal pipe extending in communication with such liquid near the bottom of the tank, a small air induction tube open at the top and extending from above the liquid level in the tank downwardly and into communication with the liquid withdrawal pipe near the lower end of the same, a pressure transmission conduit extending down to a position near the bottom of the tank and having its lower end open and positioned to receive entrained air discharged from the lower end of the liquid withdrawal pipe and a gage instrument connected with the upper end of said pressure transmission conduit.

27. The combination for use with an internal combustion motor of a fuel supply tank, a suction feed system operated by the motor for drawing fuel by suction from the tank, a pneumatic pressure gauge system comprising an indicator and a conduit extending therefrom into communication with the liquid in the tank at the depth to be gauged, and means controlled by operation of the fuel supply system for introducing air into said conduit to rectify the gauge system.

28. In combination, a fuel feed system comprising a main tank, a delivery pipe, and means for intermittently causing a flow of fuel from the tank through said pipe, a pneumatic gauge system comprising an indicator and a conduit extending therefrom into communication with the liquid in the tank at the depth to be gauged, and a connection between the delivery pipe and the conduit for introducing air to rectify the gauge system.

29. In a device of the class described, a supply tank, an intermittently operating suction device for raising a column of liquid from the supply tank and permitting the same to return by gravity, a pressure chamber having an air space and having a connection with the liquid in the tank for determining the datum level defining the bottom of the air space, a pressure operated indicator connected to the air space of said pressure chamber, and a draft tube for said suction device communicating with said pressure chamber below the datum level.

30. In a device of the class described, a supply tank, an intermittently operating suction device for raising a column of liquid from the supply tank, a pressure chamber having an air space and a liquid space and having a connection with the liquid in the tank, a pressure operated indicator connected to the air space of said pressure chamber, and a draft tube for said suction device communicating with said pressure chamber below the liquid level therein and means defining an air inlet passageway communicating with the pressure chamber.

31. In a device of the class described, a supply tank, an intermittently operating suction device for raising a column of liquid from the supply tank and permitting the same to return by gravity, a pressure chamber having an air space and a liquid space and having a connection with the liquid in the tank, a pressure operated indicator connected to the air space of said pressure chamber, a draft tube for said suction device communicating with said pressure chamber below the liquid level therein, and means for introducing air into said draft tube during the operation of said suction device.

32. In a device of the class described, a supply tank, an intermittently operating suction device for raising a column of liquid from the supply tank and permitting the same to return by gravity, a pressure chamber having an air space and having a connection with the liquid in the tank, a pressure operated indicator connected to the air space of said pressure chamber, a draft tube for said suction device communicating with the lower part of said pressure chamber, and means comprising a normally liquid sealed pipe leading to atmosphere above the level of liquid in the tank for introducing air into said draft tube during the operation of said suction device.

33. In combination, a fuel supply tank open to atmosphere, an air trap having communication with the liquid in the fuel supply tank at the depth to be gauged, a pneumaticaly operated indicator connected to the air trap, there being liquid below the air trap, a vacuum tank having a draft pipe communicating with the liquid below the air trap, and an air supply pipe communicating at its lower end with the draft pipe, and communicating at its upper end with atmosphere.

34. In combination, a liquid supply tank open to atmosphere, an air trap communicating with the liquid in the supply tank at the full depth to be measured, and an atmospheric tube extending from a point above the level of the liquid in the supply tank into communication with the liquid below the air trap, and automatic means for periodically passing air through said atmospheric tube.

35. In a fuel supply system for automobiles, a fuel tank open to atmosphere, an air pressure chamber communicating with the bottom part of the tank and having an air space and a liquid space, a pressure operated indicator communicating with the chamber, a fuel feeding device for drawing fuel from the tank for delivery to the automobile engine, and means operated automatically by said fuel feeding device for introducing air into said chamber.

36. In a pneumatic depth indicating system of the diving bell type, the method of recharging the system with air to establish a desired datum level which comprises injecting a stream of liquid and entrained air into the liquid, the depth of which is to be measured, separating the air and liquid below the level of the main body of liquid and introducing the air into the pneumatic system and depressing the liquid in the pneumatic system to a predetermined datum level.

37. In a depth indicating system of the pneumatic diving bell type, the method of recharging the system with air to establish a desired datum level which comprises, creating a gravity flow of liquid and air towards the main body of liquid, separating the air from the flow of liquid and introducing the same into said system at a pressure corresponding to the head of liquid to be measured and depressing the liquid in the pneumatic system to a predetermined datum level.

38. In a level indicating system of the pneumatic diving bell type for measuring the depth of liquid in a tank, the method of recharging such system with air to establish a desired datum level which comprises, raising a column of liquid from the tank to a point above the level of liquid, the depth of which is to be measured, introducing air into said column to charge the same with air, then dropping the column of liquid and air back towards the tank, separating the air and liquid at a point below the level of liquid in the tank, introducing the air therefrom into the indicating system and depressing the liquid in the system to a predetermined datum level from which the depth of liquid in the tank is reckoned, and returning the liquid to the tank.

39. In combination, a fuel feed system comprising a main tank, a vacuum tank having a chamber adapted to be alternately connected to suction and to atmosphere, a suction connection leading from said vacuum tank to the main tank for raising liquid fuel from said main tank, a fuel level indicating system comprising an air trap communicating with the liquid in the main tank at the full depth to be measured, and a pressure sensitive indicator connected to the air trap and actuated by variations of air pressure therein to indicate variations in the level of the liquid in the main tank, and corrective means for the indicating system controlled by operation of the vacuum tank for introducing air into the indicating system at each cycle of withdrawing liquid from the main tank by the vacuum tank.

40. The method of indicating the depth of liquid in a tank which comprises causing a stream of liquid to move from a point above the liquid in the tank into the liquid in the tank at substantially the depth to be measured, injecting air into the stream of liquid before it is discharged into the tank, separating out the air from the stream of liquid at a point below the full depth to be measured, and collecting the air so separated at a pressure corresponding to the hydrostatic head prevailing at the datum level from which the level of liquid in the tank is measured, and indicating the pressure of the air at said datum level in terms of head of liquid in the tank.

41. In a level indicating system of the pneumatic diving bell type for measuring the depth of liquid in a tank, the method of recharging said system with air to establish a desired datum level, which comprises, raising a column of liquid from the tank to a point above the level of the liquid the depth of which is to be measured, then allowing the column to flow back towards the tank, meanwhile introducing air into said column to charge the same with air, the air separating out from the returning liquid, and entering the air space of the system and depressing the liquid in the system to a predetermined datum level from which the depth of liquid is reckoned.

42. A quantity indicator for a liquid container open to the atmosphere, said indicator comprising a pressure chamber communicating with and sealed by the liquid at the full depth to be measured, pumping means by which liquid may be periodically withdrawn from the container, a gauge, a pipe connecting said chamber and gauge, a second pipe open to the atmosphere at its upper end and adapted to deliver air below the level of the communication of the pressure chamber with the liquid in the container, and relatively close to the point from which the liquid is withdrawn from the container whereby air is caused to pass down the said second pipe upon the periodic withdrawal of liquid and means for delivering said air to the pressure chamber without unsealing said pressure chamber.

43. In a pneumatic liquid level indicating system having an air chamber sealed by the liquid to be gauged, the method of charging the system with air which comprises withdrawing a small quantity of liquid from the main body of liquid, entraining air with the liquid which is withdrawn, allowing the small quantity of liquid and entrained air to flow back toward the main body of liquid, introducing the liquid and its air into the liquid sealing the air chamber, and allowing the entrained air to rise into the air chamber.

HORACE H. WELCH.